(12) United States Patent
Bachmann

(10) Patent No.: US 10,230,834 B2
(45) Date of Patent: Mar. 12, 2019

(54) APPLICATIONS, METHODS, AND SYSTEMS FOR PREVENTING A MOBILE DEVICE USER FROM OPERATING FUNCTIONS OF A MOBILE DEVICE WHILE OPERATING A MOTOR VEHICLE

(71) Applicant: Jonathan William Bachmann, Coral Springs, FL (US)

(72) Inventor: Jonathan William Bachmann, Coral Springs, FL (US)

( * ) Notice: Subject to any disclaimer, the term of this patent is extended or adjusted under 35 U.S.C. 154(b) by 29 days.

(21) Appl. No.: 15/806,857

(22) Filed: Nov. 8, 2017

(65) Prior Publication Data
US 2018/0248999 A1 Aug. 30, 2018

Related U.S. Application Data

(60) Provisional application No. 62/463,756, filed on Feb. 27, 2017.

(51) Int. Cl.
*H04W 4/40* (2018.01)
*H04M 1/725* (2006.01)
(Continued)

(52) U.S. Cl.
CPC ... *H04M 1/72577* (2013.01); *H04M 1/72538* (2013.01); *H04M 1/72552* (2013.01); *H04M 1/72572* (2013.01); *H04W 4/023* (2013.01); *H04W 4/027* (2013.01); *H04W 4/12* (2013.01); *H04W 8/183* (2013.01)

(58) Field of Classification Search
CPC . G08G 1/0104; G08G 1/205; H04M 1/72577; H04M 1/72569; H04M 11/04; H04M 1/667; H04W 4/046; H04W 48/04; H04W 4/02; H04W 8/22; H04W 4/025; H04W 64/00; H04W 4/026; H04W 4/027; H04K 2203/22; H04K 3/415; F41A 17/08; G01S 2205/006; G01S 2205/008; G01S 5/0009; G01S 5/0018; G01S 5/0054; G01S 5/06
See application file for complete search history.

(56) References Cited

U.S. PATENT DOCUMENTS 7,181,229 B2 2/2007 Singh et al.
7,656,294 B2 2/2010 Boss et al.
(Continued)

*Primary Examiner* — Kamran Afshar
*Assistant Examiner* — Dung L Lam

(57) ABSTRACT

A computer application for preventing a mobile device user from operating a mobile device while operating a motor vehicle. The computer application determines pertinent mobile devices within the motor vehicle. The application provides a user interface to each of the pertinent mobile devices for selecting a motor vehicle operator device. The application causes all pertinent mobile devices to move into a locked configuration if a motor vehicle operator device is not identified and causes non-operator devices to move into the unlocked configuration if a motor vehicle operator device is identified. The computer application causes the motor vehicle operator device to remain in the locked configuration if the motor vehicle is moving and causes the motor vehicle operator device to move into an unlocked configuration if the motor vehicle is not moving, or if the motor vehicle operator device is no longer one of the pertinent mobile devices.

20 Claims, 12 Drawing Sheets

(51) Int. Cl.
*H04W 8/18* (2009.01)
*H04W 4/02* (2018.01)
*H04W 4/12* (2009.01)

(56) References Cited

U.S. PATENT DOCUMENTS

| | | | |
|---|---|---|---|
| 7,697,917 B2 | 4/2010 | Camp, Jr. et al. | |
| 7,933,611 B2 | 4/2011 | Bocking et al. | |
| 8,145,199 B2 | 3/2012 | Tadayon et al. | |
| 8,204,649 B2 | 6/2012 | Zhou et al. | |
| 8,290,480 B2 | 10/2012 | Ambramson et al. | |
| 8,295,854 B2 | 10/2012 | Osaan, Jr. | |
| 8,401,589 B2 | 3/2013 | Liu et al. | |
| 8,494,591 B2 | 7/2013 | Bocking et al. | |
| 8,502,642 B2 | 8/2013 | Vitito | |
| 8,527,013 B2 | 9/2013 | Guba et al. | |
| 8,527,146 B1 | 9/2013 | Jackson et al. | |
| 8,538,402 B2 | 9/2013 | Vidal et al. | |
| 8,594,705 B2 | 11/2013 | Osaan, Jr. | |
| 8,676,268 B2 | 3/2014 | Riggs et al. | |
| 8,874,162 B2 | 10/2014 | Schrader et al. | |
| 8,971,927 B2 | 3/2015 | Zhou et al. | |
| 9,020,482 B2 | 4/2015 | Jones | |
| 9,042,872 B1 | 5/2015 | Breed et al. | |
| 9,124,703 B2 | 9/2015 | Tadayon et al. | |
| 9,154,913 B2 | 10/2015 | Bocking et al. | |
| 9,258,409 B1 | 2/2016 | Barfield, Jr. et al. | |
| 9,332,126 B2 | 5/2016 | Tadayon et al. | |
| 9,338,605 B2 | 5/2016 | Guba et al. | |
| 9,386,447 B2 | 7/2016 | Tibbitts et al. | |
| 9,413,871 B2 | 8/2016 | Nixon et al. | |
| 9,489,531 B2 | 11/2016 | Weiss | |
| 9,533,576 B2 | 1/2017 | Kalbus | |
| 2011/0065375 A1 | 3/2011 | Bradley | |
| 2011/0136476 A1* | 6/2011 | Beasley | H04M 1/72577 455/414.1 |
| 2011/0275321 A1 | 11/2011 | Zhou et al. | |
| 2012/0231773 A1 | 9/2012 | Lipovski | |
| 2013/0150004 A1 | 6/2013 | Rosen | |
| 2013/0217331 A1 | 8/2013 | Manente | |
| 2013/0344859 A1* | 12/2013 | Abramson | G06Q 50/265 455/418 |
| 2014/0113619 A1* | 4/2014 | Tibbitts | G07C 5/008 455/419 |
| 2014/0302834 A1 | 10/2014 | Jones | |
| 2014/0321624 A1* | 10/2014 | Weng | H04M 11/045 379/40 |
| 2016/0174132 A1 | 6/2016 | Hynes | |
| 2016/0270025 A1 | 9/2016 | Osaan, Jr. | |
| 2017/0310817 A1* | 10/2017 | Mckinney | H04M 1/72577 |

\* cited by examiner

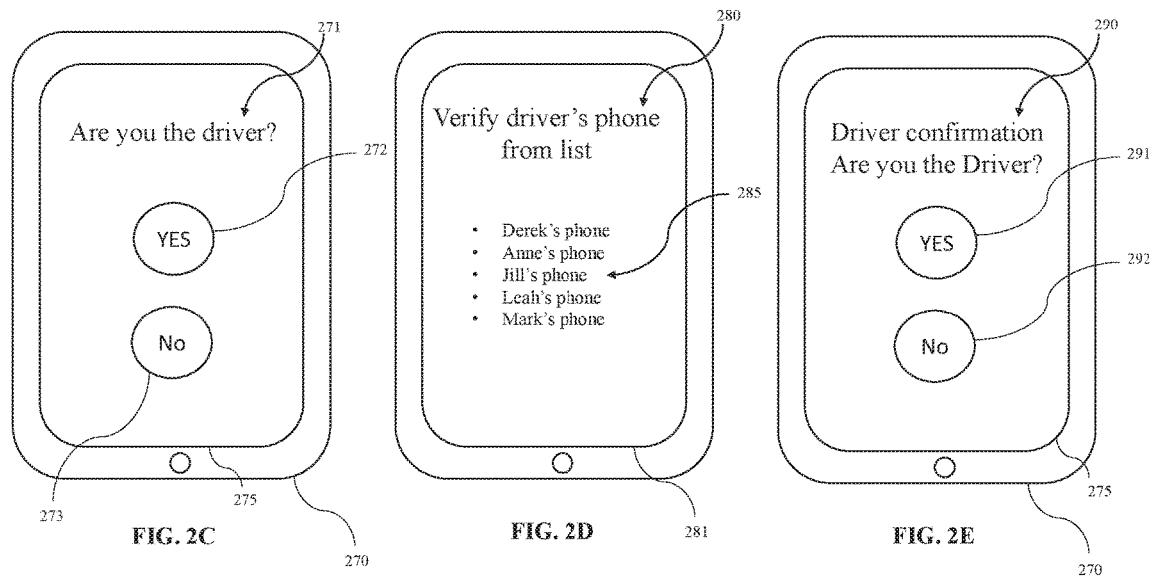

APPLICATIONS, METHODS, AND SYSTEMS FOR PREVENTING A MOBILE DEVICE USER FROM OPERATING FUNCTIONS OF A MOBILE DEVICE WHILE OPERATING A MOTOR VEHICLE

CROSS-REFERENCE TO RELATED APPLICATIONS

This application claims the benefit of the filing date of U.S. Provisional Application Ser. No. 62/463,756 titled "SYSTEM FOR PREVENTING A MOBILE DEVICE USER FROM OPERATING FUNCTIONS OF A MOBILE DEVICE WHILE OPERATING A MOTOR VEHICLE" and filed Feb. 27, 2017 and the subject matter of which is incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the field of mobile devices, and more specifically for systems for preventing use of functions of mobile devices.

BACKGROUND

The popularity of mobile devices has had some unintended and sometimes deadly consequences. An alarming number of traffic accidents are linked to distracted driving, including use of mobile devices while driving, resulting in injury and loss of life. The National Safety Council reports that cell phone use while driving leads to 1.6 million crashes each year. Nearly 330,000 injuries occur each year from accidents caused by texting while driving. 1 out of every 4 car accidents in the United States is caused by texting and driving.

One of the main reasons why people continue to use cell phones or mobile devices while driving is that they have they lack self-restraint. The term "mobile device" and "cell phone" will be used interchangeably throughout this application. People know that operating a motor vehicle while driving and texting or using a mobile device is dangerous. However, despite this fact people still text and use other distracting functions of a mobile phone while driving.

Texting while driving is further exacerbated with younger or inexperienced drivers. For example, teenagers that are now learning to drive do not understand how distracted they may be when using a mobile device while driving. Even though their parents or guardians may warn them of the dangers of operating a motor vehicle and using a mobile device, younger drivers, or teenagers still use the distracting functions of mobile devices while driving.

The prior art discloses different ways for preventing operating a motor vehicle while using a mobile device. However, many of the methods disclosed by the prior art are complex. For example, one application requires a user to take a responsive test to determine if a person is operating a motor vehicle while driving. Another application uses complex algorithms and hardware to determine if a mobile device is proximate to or in the driver's seat. However, the above examples are complex and relatively inefficient.

As a result, there exists a need for improvements over the prior art and more particularly for a more efficient way of preventing operation of a motor vehicle while using the distracting functions of a mobile device.

SUMMARY

A systems and methods for preventing a mobile device user from operating functions of a mobile device while driving a motor vehicle is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a computer application for preventing a mobile device user from operating a mobile device while driving a motor vehicle is disclosed. The computer application is receiving a plurality of mobile device user data of a mobile device user and storing the mobile device user data in a mobile device user record in an attached database; determining pertinent mobile devices within the motor vehicle by determining a) if the mobile device is moving in a similar fashion as a moving motor vehicle by using a position locating element in each mobile device; and b) if the mobile device is within a predetermined proximity of at least a second mobile device by using the position locating element in each mobile device; providing a graphical user interface to each of the pertinent mobile devices within the motor vehicle for selecting a motor vehicle operator device; causing all pertinent mobile devices to move into or remain in a locked configuration if a motor vehicle operator device is not identified; causing a plurality of motor vehicle non-operator devices to move into the unlocked configuration if a motor vehicle operator device has been identified; causing the motor vehicle operator device to remain in the locked configuration if the motor vehicle is moving; causing the motor vehicle operator device to move into an unlocked configuration if a) the motor vehicle is not moving for a predetermined amount of time, or 2) if the motor vehicle operator device is no longer one of the pertinent mobile devices.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention s not limited to the precise arrangements and instrumentalities shown, wherein:

FIG. 2C is a graphic user interface for selecting and identifying a motor vehicle operator device for applications, methods and systems for preventing a mobile device user from operating a mobile device while driving a motor vehicle, according to a third example embodiment;

FIG. 2D is a graphic user interface for selecting and identifying a motor vehicle operator device for applications, methods and systems for preventing a mobile device user from operating a mobile device while driving a motor vehicle, according to a fourth example embodiment;

FIG. 2E is a graphic user interface for confirming a motor vehicle operator device for applications, methods and systems for preventing a mobile device user from operating a mobile device while driving a motor vehicle, according to a fourth example embodiment;

DETAILED DESCRIPTION

Figure 1:
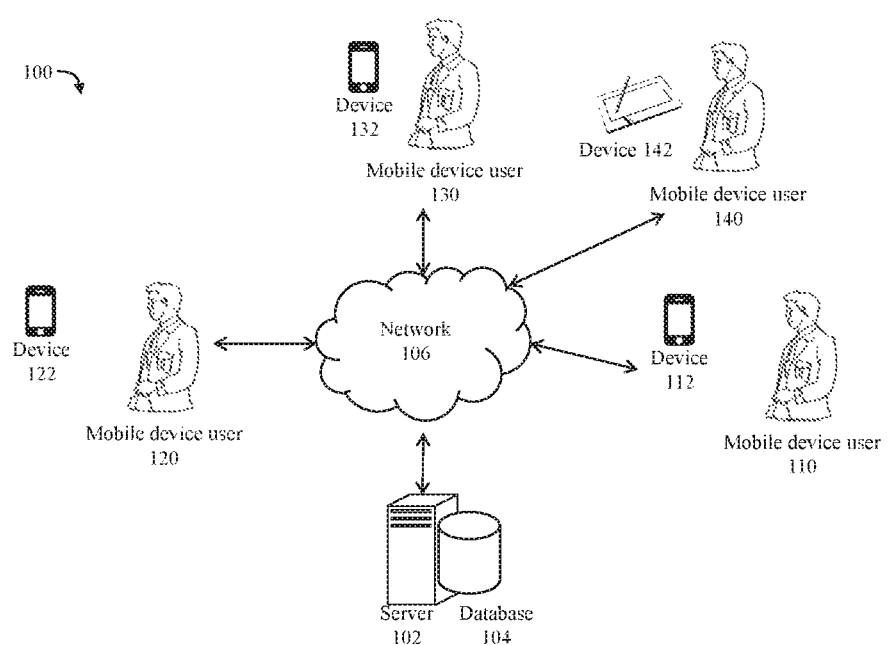
FIG. 1 is a diagram of an operating environment that supports applications, methods and systems for preventing a mobile device user from operating a mobile device while driving a motor vehicle, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing application, systems and methods that prevent a motor vehicle operator from distracting use of a mobile device while operating a motor vehicle. In one embodiment, the system also improves over the prior art by allowing a motor vehicle operator to still have access to the Global Positioning System (GPS) and geographical map data. In one embodiment, the system also improves over the prior art by providing a simple and non-complicated means of determining who the motor vehicle operator is by requiring users of the mobile devices determined to be within a vehicle to select motor vehicle operator device and if a motor vehicle operator device is not selected then the system moves all pertinent devices determined to be within the vehicle to move into the locked configuration. In one embodiment, the system prevents the normal operation of mobile devices unless all pertinent mobile devices in the vehicle select the same motor vehicle operator device. In other embodiments, the system prevents the normal operation of mobile devices unless one of the pertinent mobile devices in the vehicle selects a motor vehicle operator device. The system also improves over the prior art by sending a message to authorities or an emergency contact if the system determines that a crash event or accident has occurred. The system also improves over the prior art by sending a message to a person attempting to contact a mobile device of a motor vehicle operator wherein the message informs the person attempting to make contact that the motor vehicle operator is operating a motor vehicle.

Referring now to the Figures. FIG. 1 is a diagram of an operating environment or system 100 that supports a computer application and system for preventing a mobile device user from operating a mobile device while driving a motor vehicle over a communications network 106, according to an example embodiment. The environment 100 may comprise mobile devices 112, 122, 132, device 142 and servers 102, all of which may communicate with server 102 via a communications network 106. Mobile devices 112, 122, 132 and device 142 may comprise any computing devices, such as integrated circuits, printed circuit boards, processors, ASICs, PCBs, cellular telephones, smart phones, tablet computers, laptops, and game consoles, for example. Mobile devices 112, 122, 132, and device 142 may be connected wirelessly to the communications network 106. Communications network 106 may include one or more packet switched networks, such as the Internet, or any local area networks, wide area networks, enterprise private networks, cellular networks, phone networks, mobile communications networks, or any combination of the above. In one embodiment, mobile devices 112, 122, 132, and device 142 are a programmable logic controller PLC.

Server 102 includes a software engine that delivers applications, data, program code and other information to networked devices 112, 122, 132, and 142. The software engine of server 102 may perform other processes such as transferring multimedia data in a stream of packets that are interpreted and rendered by a software application as the packets arrive. FIG. 1 further shows that server 102 includes a database or repository 104, which may be a relational database comprising a Structured Query Language (SQL) database stored in a SQL server or a database that adheres to the NoSQL paradigm. Devices 112, 122, 132, 142 may also each include databases. The database 104 may serve sensor data, as well as related information, used by server 102 and devices 112, 122, 132 and 142 during the course of operation of the invention. For example, such devices may include a sensor or position locating element for providing location data, which includes the geoghraphic position of the mobile phone, for determining if the mobile device is within the proximity of other mobile devices and for determining if each mobile device is moving similar to how a motor vehicle is moving. Such sensor or position locating element may comprise technology such as GPS transceiver, GPS technology, a wireless communication element, such as WIFI, Bluetooth, NFC etc. Additionally, each of the mobile devices may include a sensor or position locating element that provides accelerometer data, such as speed, velocity, acceleration, deceleration of the mobile phone, or include other technologies for determining if each mobile device is moving similar to how a motor vehicle is moving. In one embodiment, the data provided by mobile devices is provided to server 102 via TCP/IP and/or HTTP over network 106.

Devices 112, 122, 132, 142 and server 102 may each include program logic comprising computer source code, scripting language code or interpreted language code that perform various functions of the present invention. In one embodiment, the aforementioned program logic may comprise program module 607 in FIG. 6. It should be noted that although FIG. 1 shows only one devices 112, 122, 132, 142 and one server 102, the system of the present invention supports any number of computing devices, servers and client computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

Various types of data may be stored in the database 104 of server 102. For example, the database may be the configured to store user data of each user in a user record. In one embodiment, the user data may include a user name, age, email address, a code for activating an override feature and for allowing the mobile device to move from a locked configuration to an unlocked configuration, emergency contact name, emergency contact number, emergency contact email, etc. Additionally, user data may include GPS position data, social media data, emergency contact information, personalized messages to be sent to incoming callers, parameters for determining whether a vehicle is moving, as well as many other parameters that are within the spirit and scope of the present invention. The database may also store user status data, such as if emergency assistance was required after a traffic event, velocity data associated with a traffic event, acceleration data related to a traffic event, time of traffic event, etc. The database may include rules that defining the algorithms presented below.

Additionally, each of the mobile devices is configured to be able to be moved between a locked configuration and an unlocked configuration. In an unlocked configuration, the remote computing device or mobile device allows for full normal operating mode. In full operation mode a user has access to the normal operating features to which a user would have access, such as communication functions, such as, but not limited to, e-mail and text messages, internet access, etc. In the locked configuration and operator has limited access or no access to a remote computing device or mobile device. In one embodiment, in the locked configuration, the user has no access to communication functions, such as, but not limited to, e-mail and text messages, internet access, etc. For example, in one embodiment, in the locked configuration a user only has access to GPS and other geographical map data for navigation purposes. Map data includes data used to display graphical images of geographical maps, satellite maps and directions to and from locations. Map data also refers to data and applications, such as Google Map®, and other information that allows a consumer to navigate using their mobile phone. In other embodiments, in the locked configuration a user has access to no functions of the cellular telephone or mobile device. It is also understood that in other embodiments, the features that a user may have access to may be adjusted for both the locked and the unlocked configuration.

Figure 2:
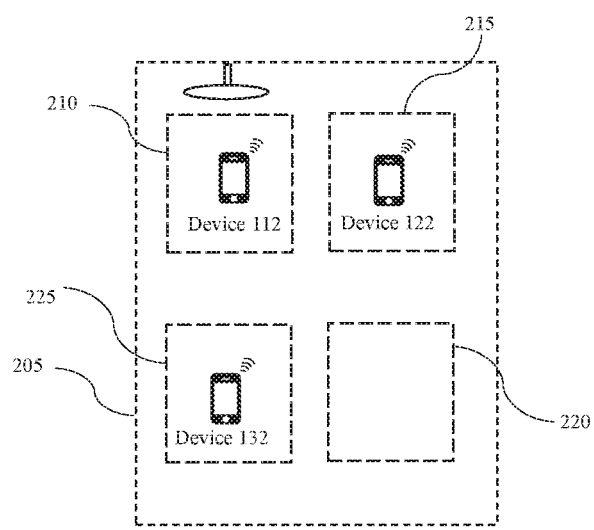
FIG. 2 is a diagram illustrating mobile devices within a motor vehicle for illustrative purposes for applications, methods and systems for preventing a mobile device user from operating a mobile device while driving a motor vehicle, according to an example embodiment.

FIG. 2 is a diagram illustrating mobile devices within a motor vehicle for illustrative purposes, according to an example embodiment. Dashed line 205 represents the body of a motor vehicle. Larger dashed lines 210, 215, 220, 225 represents seats wherein passengers within the motor vehicle driver may be positioned. It is understood that a motor vehicle may be any motor vehicle such as a car, truck, bus, sports utility vehicle, motor cycle, boat, train etc. Devices 112, 122, 132 are positioned within several of the seats. As will be further explained below, the present invention allows a user to more easily prevent the driver of a motor vehicle from operating a mobile device while a person is driving. One improvement over the prior art is that the system prevents an individual from operating a motor vehicle and using a mobile device by requiring that a user identify a motor vehicle operator device within the vehicle and not simply state that the person is the passenger of the vehicle.

In the present embodiment, the driver or operator of the vehicle is positioned in seat 210 and has a corresponding device 112. It is understood that the mobile vehicle operating device is the device of a person that is identified by the system to be operating a motor vehicle. The motor vehicle non-operating device is a device that has not been identified by the system as the motor vehicle operating device and is not being used by the operator of a motor vehicle. Devices 122, 132 positioned in positions 215 and 225, respectively, are the motor vehicle non-operating devices given that those devices are positioned in the passenger seats and assuming that the motor vehicle operator device has been identified by the system as device 112. In the present embodiment, the driver or operator of the vehicle is positioned in seat 210 and has a corresponding device 112, which may have been identified as the motor vehicle operating device by the system as further explained below.

FIGS. 2A-2F are examples of graphic user interfaces displayed each of the mobile devices determined to be within the vehicle (pertinent mobile devices) for selecting and identifying a motor vehicle operator device, according to an example embodiment. The present embodiments improve over the prior art by allowing users of the system to select, via a graphical user interface (see for example FIG. 2A), a mobile device within the vehicle to be identified as the motor vehicle operator device and the driver of the motor vehicle. As will be further explained below, in one embodiment, the system first determines the pertinent mobile devices to be within the motor vehicle. The system causes all mobile devices determined to be within the motor vehicle (pertinent mobile devices) to move into or remain in a locked configuration if a motor vehicle operator device is not identified by the system within a predetermined amount of time. On the other hand, if a mobile vehicle operator device is identified by the system within a predetermined amount of time, then the system causes all motor vehicle non-operator devices determined to be within the vehicle to move into or remain in the unlocked configuration and causes the motor vehicle operator device to move into or remain in a locked configuration.

In one embodiment, the motor vehicle operator device is identified by the system if the following condition is met: 1. a first user of a first pertinent mobile device, using the graphic user interface of the first pertinent mobile device, selects an icon, which represents one of the pertinent mobile devices determined to be within the vehicle, to be the motor vehicle operator device.

In another embodiment, the motor vehicle operator device is identified if all the following conditions are met: 1. a first user of a first pertinent mobile device, via the graphic user interface of the first pertinent mobile device, selects an icon, which represents one of the pertinent mobile devices determined to be within the vehicle, to be the motor vehicle operator device; 2. a second user of a second pertinent mobile device, via the graphic user interface of the second pertinent mobile device, selects an icon, which represents one of the pertinent mobile devices determined to be within the vehicle, to be the motor vehicle operator device, and 3. the icon selected by both the first and second user correspond to the same pertinent mobile device.

In another embodiment, the motor vehicle operator device is identified if all the following conditions are met: 1. a user for each pertinent mobile device, via the graphic user interface of each pertinent device, selects an icon, which represents one of the pertinent mobile devices within the vehicle, to be motor vehicle operator device; and, 2. all of the icons selected by each of the pertinent mobile devices users correspond to the same mobile device.

In another embodiment, in addition or alternatively to the above the requirements to identify the motor vehicle operator device, each user of each pertinent mobile device (or at least one of the pertinent mobile devices determined to be within the vehicle) may be required to confirm, via a display on the graphical user interface, by selecting within a predetermined amount of time, an icon either approving or denying that he or she is the user of the motor vehicle operator device for the system to identify the motor vehicle operator device.

The following condition may also have to be met for the system to identify the motor vehicle operator device: after each user of each of the pertinent mobile devices, via the graphic user interface, selects the icon representing the motor vehicle operator device, a display is provided to the pertinent mobile device selected as the motor vehicle operator device for the user of that device confirming that he or she is actually the motor vehicle operator device, via the graphic user interface, by selecting an icon representing that he or she is the motor vehicle operator device.

In any of the above embodiments, the motor vehicle operator device is not identified if any of the required conditions are not met within a predetermined amount of time. If any of the conditions are not met within the predetermined amount of time, the system causes all pertinent mobile devices determined to be within the same motor vehicle to move into or remain in a locked configuration.

Figure 2A:
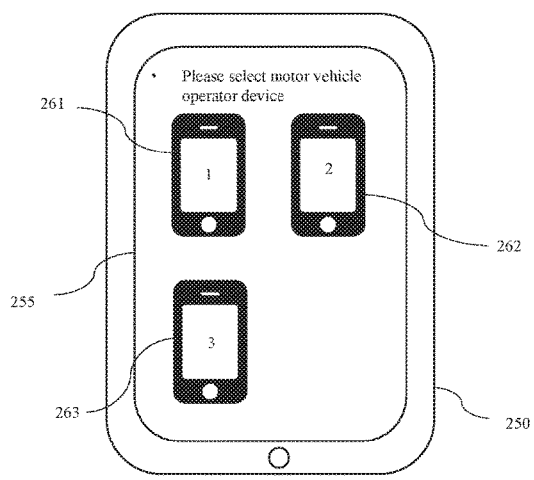
FIG. 2A is a graphic user interface for selecting and identifying a motor vehicle operator device for applications, methods and systems for preventing a mobile device user from operating a mobile device while driving a motor vehicle, according to an example embodiment.

FIG. 2A, is an example of a graphical interface displayed on a mobile device for selecting and identifying a motor vehicle operator device, according to an example embodiment. The system is configured to provide, over the communications network, to each mobile device that is determined to be a pertinent device within the vehicle the graphical user interface for selecting a motor vehicle operator device. However, it is understood that other embodiments of a user interface 255 for selecting a motor vehicle operator device from one of a plurality of pertinent devices within a motor vehicle may also be used and is within the spirit and scope of the present invention. The graphical interface may be displayed on a mobile device 260, such as a cellular telephone, iPhone®, iPad®, tablet, smart phone or any other mobile device. The interface may include graphical icons 261, 262, 263, wherein each icon represents a pertinent mobile device determined to be within a vehicle. For example, in operation, the system displays icons 261, 262, 263 for each mobile device that has been determined by the system to be a pertinent mobile device within the motor vehicle. A device is a pertinent mobile device within motor vehicle: a) if the mobile device is moving in a similar fashion as a moving motor vehicle as identified by a position locating element in each mobile device; and b) if the mobile device is within a predetermined proximity of at least another mobile device by as identified by the position locating element in each mobile device. The graphical user interface (such as identified in FIG. 2A) is provided to each of the pertinent mobile devices within the motor vehicle and is for receiving input from each respective mobile device operator for selecting, via the graphical user interface, a motor vehicle operator device. It is also understood that other graphical interfaces that allow a user to select the motor vehicle operator device, may also be used and is within the spirit and scope of the present invention, A user may select an icon or other graphical representation on the display by interfacing with screen with a swipe or swiping gesture, push or other means of indicating a user preference. The graphic user interfaces may be configured for displaying information and receiving input from users and are well known to those skilled in the art. The displays identified in FIGS. 2A-2B may be displayed before the user has access to any other feature. The system is configured such the system does not allow the user to access any other function of the mobile device if the user does not select a mobile device operator within a predetermined period of time. Referring to FIG. 2A, such a display may be displayed on each mobile device that is determined to be a pertinent mobile device. If the system determines that only one pertinent mobile device is within the vehicle, then only one icon representing a pertinent mobile device will be displayed. In FIG. 2A, three icons are displayed because the system determined that only three pertinent mobile devices exist. Each mobile device user may select the icon that represents one of the pertinent mobile devices to be the motor vehicle operator device. It is understood that the icons may include an identifying mark so that the icon can represent each user. For example, referring to FIG. 2A, a first user using a first pertinent mobile device may select icon 261, which is received by the system as that the first user has selected the mobile device corresponding with icon 261 to be the motor vehicle operator device. A second user using a second pertinent mobile device may select icon 261, which is received by the system as that the second user has selected the mobile device corresponding icon 261 to be the motor vehicle operator device. As mentioned above, after the users select, via the graphic user interfaces the motor vehicle operator device, the system will determine if all conditions have been meet for the motor vehicle operator device to deem to be identified. It is understood that the term "graphic user interface" and "graphical user interface" may be used interchangeably throughout this application.

As mentioned above, in one embodiment, the motor vehicle operator device is identified by the system if the following condition is met: 1. a first user of a first pertinent mobile device, via the graphical user interface of the first pertinent mobile device, selects an icon, which represents one of the pertinent mobile devices determined to be within the vehicle, to be the motor vehicle operator device; 2. a second user of a second pertinent mobile device, via the graphical user interface of the second pertinent mobile device, selects an icon, which represents one of the pertinent mobile devices determined to be within the vehicle, to be the motor vehicle operator device, and 3. the icon selected by both the first and second user correspond to the same pertinent mobile device. In this case, the system will determine that device corresponding to icon 261 will be the motor vehicle operator device and all other pertinent mobile devices will be motor vehicle non-operator devices. However, it is understood that other conditions for system to identify a motor vehicle operator device may also be used and are within the spirit and scope of the present invention.

Figure 2B:
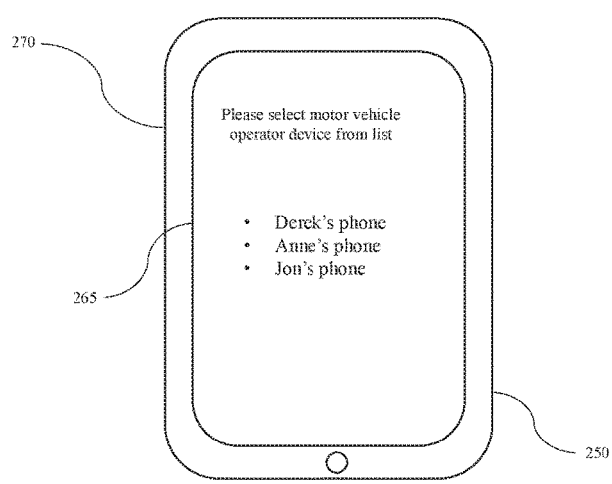
FIG. 2B is a graphic user interface for selecting and identifying a motor vehicle operator device for applications, methods and systems for preventing a mobile device user from operating a mobile device while driving a motor vehicle, according to a second example embodiment.

By way of another example, FIG. 2B is a second example of a graphical user interface 265 for a mobile device 250 that may be displayed on all of the pertinent devices. In FIG. 2B, a mobile device user may select a motor vehicle operator device from the list 270 of pertinent mobile devices. For example, referring to FIG. 2B, a first user using a first pertinent device may select icon representing Derek's phone, which is received by the system as that the first user has selected the mobile device corresponding with the mobile device owned by Derek to be the motor vehicle operator device. A second user using a second pertinent device may select icon corresponding to Derek's phone, which is received by the system as that the second user has selected the mobile device corresponding with the mobile device owned by Derek to be the motor vehicle operator device. However, the third pertinent mobile device determined to be within the vehicle did not select an item in the predetermined amount of time. After the users select, via the graphical user interfaces the motor vehicle operator device, the system will determine if all conditions have been meet for the motor vehicle operator device to deem to be identified. In this example, the system requires that all the following conditions are met: 1. a user for each pertinent mobile device, via the graphical user interface of each pertinent device, selects an icon, which represents one of the pertinent mobile devices within the vehicle, to be motor vehicle operator device; and, 2. all of the icons selected by each of the pertinent mobile devices users correspond to the same mobile device. In this example, no motor vehicle operator was identified because all of the pertinent mobile devices determined to be within the vehicle did not make a selection.

FIGS. 2C-2E are graphic interfaces for selecting and identifying a motor vehicle operator device for applications, methods and systems for preventing a mobile device user from operating a mobile device while driving a motor vehicle, according to other example embodiments. In these embodiments, the system is configured to provide, over the communications network, to each mobile device that is determined to be a pertinent device within the vehicle, the graphical user interface 275 for selecting a motor vehicle operator device identified in FIG. 2C. However, it is understood that other embodiments may also be use and are within the spirit and scope of the present invention. Displayed on user interface is a yes or no question 271. In the present embodiment the question is "Are you the driver?" However, other questions requiring a response may also be within the spirit and scope of the present invention. The system may require a response from each of the pertinent mobile devices determined to be the motor vehicle within a predetermined amount of time. The response may include the selecting icon 272 to indicate that YES the user is the driver or operator of the vehicle or to select icon 273 to indicate NO that the user is not the driver or operator of the vehicle. In one embodiment, if no response is received within a certain period of time by all pertinent mobile devices then the system may determine that the motor vehicle operator device has not been identified and the system will move the process forward and all pertinent mobile devices determined to be within the Vehicle will move to or remain in locked configuration. In another embodiment, the system may require that only the driver or motor vehicle operator provide a response by selecting an icon that indicates that the user is operator or driver of the vehicle. In such an embodiment, if the user selects, via the graphical user interface, an icon indicating that he or she is the driver of operator of the vehicle, then the that pertinent mobile device will be identified as the motor vehicle operator device and the system will move the process forward and all pertinent motor vehicle non-operator mobile devices determined to be within the vehicle will move to or remain in unlocked configuration and the motor vehicle operator mobile device will move to or remain in locked configuration.

In another embodiment, after each pertinent mobile device determined to be within the single vehicle selects that their mobile device is not the motor vehicle operator device, then the system may be configured to provide another display 281 such as the display illustrated in FIG. 2D, to each pertinent mobile device.

FIG. 2D illustrates that on user interface is text or graphics 280 ("Verify driver's phone from list") that require the user to select an icon, which represents one of the pertinent mobile devices determined to be within the vehicle, to be the motor vehicle operator device. In the present embodiment the text or graphics requires the user to select one of five icons in a list 285. However, other questions or text requiring different responses may also be within the spirit and scope of the present invention. Additionally, other means of allowing the user to select the motor vehicle operator device from multiple devices (such as illustrated in FIG. 2A) may also be used and is within the spirit and scope of the present invention, Similar to above, each of the pertinent mobile device users determined to be within the vehicle may be required to select one of the icons from the list 285 within a predetermined amount of time or the system may deem that the motor vehicle operator device has not been identified and the system will move the process forward and all pertinent mobile devices determined to be within the vehicle will move to or remain in locked configuration. In one embodiment, the system may determine that the motor vehicle operator device has been selected if all the following conditions are met: 1. a user for each pertinent mobile device, via the graphical user interface of each pertinent device, selects an icon, which represents one of the pertinent mobile devices within the vehicle, to be motor vehicle operator device; and, 2. all of the icons selected by each of the pertinent mobile devices users correspond to the same mobile device.

In yet another embodiment, after at least one pertinent mobile device has selected the motor vehicle operator device from list 285 on the graphical user interface, the system may require the user of the device that was selected as the motor vehicle operator device to confirm, via a graphical user interface, by selecting an icon, that he or she is actually the motor vehicle operator device.

FIG. 2E is an example a graphic interface for confirming a motor vehicle operator device that may be used as part of the process for selecting and identifying the motor vehicle operator device. FIG. 2E is a graphic user interface that may be used for the user, which has been selected by at least one other pertinent mobile device within a motor vehicle, to confirm or deny that he or she is the user of the motor vehicle operator device. In one embodiment, in addition or alternatively to the above the requirements to identify the motor vehicle operator device, each user of each pertinent mobile device (or at least one of the pertinent mobile devices determined to be within the vehicle) may be required to confirm, via a display on the graphical user interface, by selecting within a predetermined amount of time an icon approving 291 or an icon denying 292 that he or she is the user of the motor vehicle. In operation, if the selected motor vehicle operator device within the predetermined amount of time selects the icon confirming that he or she is the driver of the vehicle, then the system will deem the motor vehicle operator device to be identified. If the selected motor vehicle operator device within the predetermined amount of time selects the icon confirming that he or she is the driver of the vehicle, then the system will deem the motor vehicle operator device to be identified. FIG. 2E, is only an example embodiment and other embodiments of a graphic user interface for allowing the user of the selected motor vehicle operator device to confirm or deny that he or she is the motor vehicle operator device are also within the spirit and scope of the present invention.

In one embodiment, the system improves over the prior art by requiring users of the system to accurately select, via an interface, a mobile device determined to be within a single vehicle to be the motor vehicle operator device and causes all mobile devices determined to be within the motor vehicle to move into a locked configuration if a motor vehicle operator device is not identified by the system within a predetermined amount of time. In another embodiment, the system moves all pertinent mobile devices within a single vehicle to move into the locked configuration and prevents any pertinent device from moving into the unlocked configuration unless a motor vehicle operator device has been correctly and timely identified. In one embodiment, the system also causes the motor vehicle operator device to remain in the locked configuration and causes the motor vehicle non-operator devices 122, 132 of the passengers within the vehicle to move into the unlocked configuration if all mobile devices determined to be within the motor vehicle identity the same motor vehicle operator device from the mobile devices determined to be within the motor vehicle. In one embodiment, the system causes the motor vehicle operator device to remain in the locked configuration and causes the motor vehicle non-operator devices 122, 132 of the passengers within the vehicle to move into the unlocked configuration if at least one mobile device determined to be within the motor vehicle selects a motor vehicle operator device from the mobile devices determined to be within the motor vehicle. As mentioned above, other means of identifying a motor vehicle operator device may be used that are consistent with the embodiments of this invention.

Figure 3:
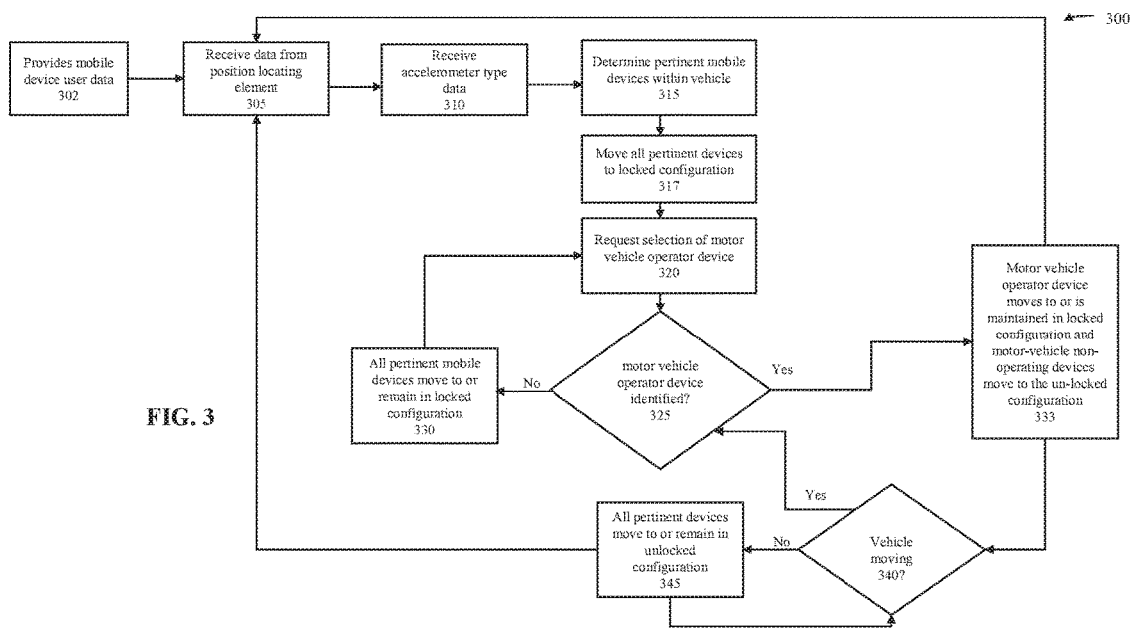
FIG. 3 is a flowchart showing the control flow of the process for applications, methods and systems for preventing a mobile device user from operating a mobile device while driving a motor vehicle, according to an example embodiment.

FIG. 3 is a flowchart showing the control flow of the process 300 for preventing a mobile device user from operating the distracting functions of a mobile device while driving a motor vehicle, according to an example embodiment. As illustrated in step 302 the system provides a graphical user interface for receiving a plurality of mobile device user data of a mobile device user. In this step, the user provides his or her name, email address, contact information, emergency contact information, as well as other data such as moving vehicle parameters, message to be sent to incoming callers and text-cars. In other embodiments, the system is further configured to provide a graphical user interface for receiving override data or a code for activating an override feature and allowing the mobile device to move from a locked configuration to an unlocked configuration. In one embodiment, the code comprises four-digit alpha-numeric characters. The code may be originally provided to the mobile device user by telephone. In one embodiment, the user can enter in or select his or her own code for overriding the system or to manually move the system from the locked configuration to the unlocked configuration. In other embodiments, device user must call into a central database to receive the code for the first time. The step of calling into a centralized database to receive a code allows the mobile device owner, such as a parent or other legal guardian of a teenager or younger person, to receive the code while preventing the teenager or other younger driver for receiving the code. The user data is stored in the attached database 104 in a corresponding user record. After a user registers the mobile device and downloads the application onto the device, the computer application goes to the next step.

In step 305, the server of the system receives, over the communication network, provides location data from the position locating element of each of a plurality of devices. As mentioned above, the locating element or position locating element may comprise a GPS providing element, such as a GPS transceiver, GPS technology, a wireless communication element, such as WIFI, Bluetooth, NFC or any combination thereof. The position locating element may be implemented on the mobile device or attached to the device. The position location element comprises the hardware of the mobile devices and optimizes internal systems such as GPS, RFID, accelerometers to increase the accuracy and extent of capturing information such as but not limited to, rate, location, events and actions. Actions are determined based upon the hardware triangulation and system resources available such as use of e911 chip, GPS antenna, GPS transceiver, near-fi radio, feed from Internet, altimeter, accelerometer, input output devices, microphone, touchscreen, keyboard, buttons, camera input, sensors, etc. In typical embodiments data is initially stored on the device and then relayed to the server upon a complete connection, but is also relayed in real time when possible. The position location element uses the technology provided by the phone and may include GPS tracking units, accelerometers and other means such as sensors or receivers for triangulation information over a computer network for detecting movement and estimating the speed and geographic location of devices. Those skilled in the art appreciate other means of estimating speed and detecting movement of devices may also be used and are within the spirit and scope of the present invention.

Figure 3A:
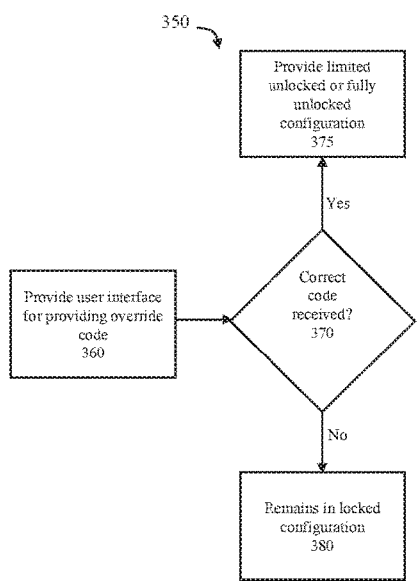
FIG. 3A is a flowchart showing the control flow of the process for allowing a limited unlocked configuration if a correct code for activating the override feature is received for applications, methods and systems for preventing a mobile device user from operating a mobile device while driving a motor vehicle, according to an example embodiment.
Figure 3B:
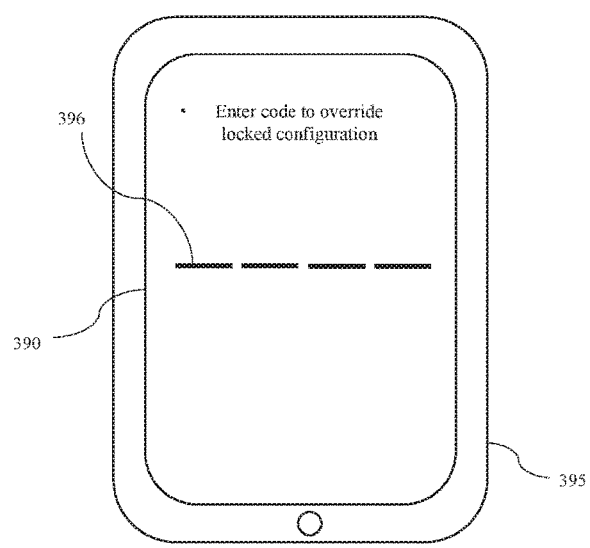
FIG. 3B is a graphic interface for receiving override data for allowing the mobile device to move between the locked configuration into the unlocked configuration for applications, methods and systems for preventing a mobile device user from operating a mobile device while driving a motor vehicle, according to an example embodiment.
Figure 3C:
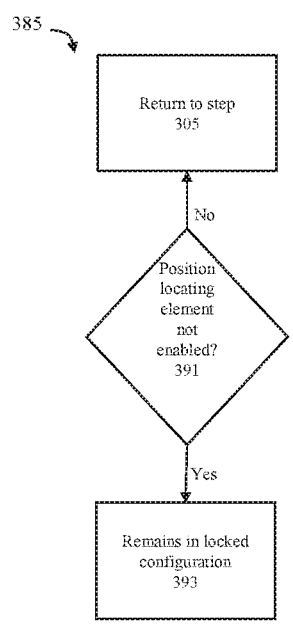
FIG. 3C is a flowchart showing the control flow of the process for moving the system to a locked configuration if a position locating element is not enabled for applications, methods and systems for preventing a mobile device user from operating a mobile device while driving a motor vehicle, according to an example embodiment.
Figure 3D:
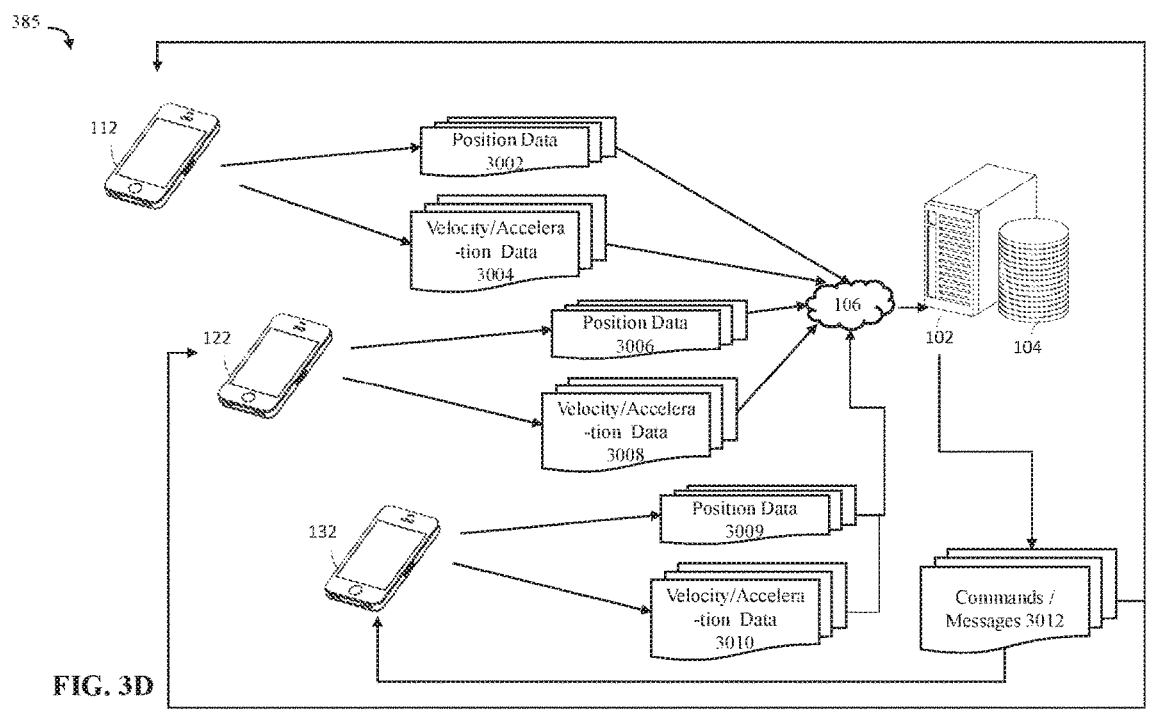
FIG. 3D is a block diagram illustrating the data flow of location data obtained and transmitted by a position locating element of mobile devices and commands and messages from the server to mobile devices, according to an example embodiment.

FIG. 3D is a block diagram illustrating the data flow 3000 of location data obtained and transmitted, over the communications network, from a position locating element of mobile devices to the server and commands and messages transmitted, over the communications network, from the sever 102 to mobile devices 112, 122 and 132. As illustrated in FIG. 3D, mobile devices 112, 122, and 132 transmit over the communication network location data, position data 3002, 3006, 3009 and velocity/acceleration data 3004, 3008, 3010 associated with each device to the server 102 of the system so that the server can calculate the location and velocity of each device 112, 122, and 132. In one embodiment the location data may include only position data and in other embodiments the location data may also include position data and accelerometer type data. Position data refers to the geographical location or GPS coordinate data that allows a server to identify the position on the earth that phone a mobile phone is located. Accelerometer type data may include data such as velocity, acceleration, deceleration, time etc. It is understood that the servers may use algorithms to determine the velocity and acceleration of a device from position data received from the device. Additionally, in other embodiments, the velocity and acceleration of the device may be provided with the position data by the position locating element in data packets to the system. The system is configured to store the location data of each mobile device in each mobile device corresponding mobile device user record. In one embodiment, the location data may be GPS type data or data packets transmitted from a position locating element of each mobile device associated with the system. The server uses algorithms to analyze the location data received from each device to determine the location of each cell phone using the system relative to other cellphones using the system. The location data allows the system to calculate if a first mobile device is within a predetermined proximity of other mobile devices using the system. The predetermined proximity can be adjusted. In one embodiment, the predetermined proximity is a parameter can be preprogrammed and may be correspond to the dimensions of motor vehicles. In one embodiment, the predetermined proximity or distance may be between 5 to 12 feet, or other dimension similar to the inside of a motor vehicle's cab. For example, referring to FIGS. 2 and 3D, the server 102 can analyze and compare the location data received from the devices 112, 122 and 132. The server will use algorithms to determine that the first mobile device 112 is within a 5 to 7-foot distance to a second mobile device 122 and the third mobile device 132, and as a result the devices may be considered to be within the predetermined proximity of each other and one of the conditions of determining the pertinent mobile devices with the motor vehicle has been satisfied.

In another embodiment, the position location element may use a wireless element comprising a receiver to detect WIFI signals to determine if a user is within a predetermined proximity of at least a second mobile device by using the position locating element in each mobile device. Signals emitted from mobile devices 112, 122, 132 may be received by the receiver of other devices within a predetermined proximity. Algorithms based upon the signal strength of may be used to calculate if devices are within a predetermined proximity of each other. Next, optionally or in addition to step 305, in step 310, the server receives accelerometer type data, such as velocity, acceleration, deceleration etc. from the position locating element. The system utilizes algorithms that identify if a mobile device is moving in a fashion similar to how a motor vehicle moves to determine if the mobile device is within a motor vehicle. It should be pointed out the position location element may be a single component or device or more than one component or device. Similar to the velocity data/acceleration data that may be calculated from the position data that includes streaming geographical coordinate data provided by each mobile device, the acceleration data may be used in algorithms by the server to determine if a mobile device or a group of mobile devices are moving in a fashion similar to a motor vehicle. A mobile device or group of mobile devices may be moving in a fashion similar to a motor vehicle if system determines that the devices are moving at a velocity or rate of speed greater than a predetermined threshold for a predetermined amount of time. For example, if the locating elements from devices 112, 122, 132 provide accelerometer type data, or if the system calculates from the position data received that mobile devices 112, 122, and 132 are moving at a speed of approximately 25 miles per hour for more than 0.5 seconds, then the server may calculate that the devices 112, 122, 132 are moving in a similar fashion as a moving motor vehicle. It is understood that the velocity or acceleration threshold for the system to determine that the mobile device is moving or is considered a moving motor vehicle may be adjusted. For example, the velocity or acceleration threshold may be 5 miles per hour, 10 miles per hour etc. Additionally, the predetermined amount of time may also be adjusted. Additionally, the system may also include algorithms to determine if a person is in a passenger of a bus or other large vehicle. For example, if the system determines that 70 mobile devices that are within a predefined area that is similar to a bus or train, then the system will determine that such devices were not considered pertinent devices as defined below.

Next, in step 315, the server uses algorithms to determine all pertinent mobile devices by determining a total number of mobile devices that are within a predetermined proximity of each other by using location data from the position locating element in each mobile device and determining if each mobile device is moving in a similar fashion as a moving motor vehicle by using position locating element. Referring to FIGS. 1-2, if three mobile devices are determined to be within a predetermined proximity of each other (such as 5 to 12 feet, or other dimension that is similar to the size of a cab of a vehicle), AND all three mobile devices were moving in a fashion similar to a moving motor vehicle, then each device would be considered a pertinent mobile device.

Optionally, the server may also include additional limitations for determining pertinent mobile devices within the motor vehicle. For example, an additional limitation that all devices must be moving at the same velocity may be used to determine the pertinent mobile devices. In such an embodiment, the server would use the following conditions to calculate the pertinent mobile devices within the same motor vehicle: a) is the mobile device is moving in a similar fashion as a moving motor vehicle by using a position locating element in the mobile device; b) if the mobile device is within a predetermined proximity of at least a second mobile device by using the position locating element in each mobile device; and, c) if each mobile device is moving or not moving at proximately the same velocity and at approximately the same time.

Next, in one embodiment, the system moves to step 317. In step 317, the system moves all the pertinent mobile devices identified in a single vehicle into the locked configuration. Referring to FIG. 3D, the data, messages and commands transmitted from the server to the mobile devices 112, 122, 132 may be sent via TCP/IP and/or HTTP over network 106. The rules for providing such commands may be stored in the attached database 104. As mentioned above, and the locked configuration and operator has limited access or no access to a remote computing device or mobile device. For example, in one embodiment, in the locked configuration a user only has access to GPS and other geographical map data for navigation purposes. In other embodiments, in the locked configuration a user has access to no functions of the cellular telephone or mobile device. Step 317 and moving all of the pertinent mobile devices into the locked configuration makes it more likely that users will identify correctly the motor vehicle operator device.

Next in step 320 the computer application will provide graphic user interfaces to all mobile devices determined to be a pertinent mobile device so that the users of each resident mobile device can select the motor vehicle operator device. Similar to the other user interfaces, a user interface for selecting the motor vehicle operator device may be a graphical user interface that is configured for providing user information as well as for receiving a user information from the user. The user interface is configured to allow each residence mobile device user to select one of the mobile devices determined to be within the motor vehicle (pertinent mobile device) to be a motor vehicle operator device and for providing such driver data to the system for processing. FIGS. 2A-2E, are examples of graphical interfaces displayed on each pertinent mobile device for selecting and confirming the motor vehicle operator device. The graphical interface displayed in FIGS. 2A-2E may be provided to persons mobile devices and used for selecting a motor vehicle operator device. However, it is understood that other graphical interfaces may be used so mobile device users can select, using the graphic user interface on each of their mobile devices the motor vehicle operator device from one of the pertinent devices.

Next in step 325, the system determines from the data received from the user interface from the pertinent mobile devices to determine if a motor vehicle operator device has been identified based upon the data received. In additions to the embodiments identified in FIG. 2A-2E, in one embodiment, all the pertinent mobile devices identified to be within a single motor vehicle must select the same motor vehicle operator device for the motor vehicle operator device to be identified. Additionally, the user of the pertinent mobile device selected by the other users as motor vehicle operator device must confirm, using the graphic user interface, that he or she is operating the vehicle (similar to FIG. 2E). In another embodiment, at least one pertinent mobile device within a single vehicle must select a motor vehicle operator device for the motor vehicle operator device to be identified and the user of the pertinent mobile device selected as motor vehicle operator device must confirm, using the graphic user interface, that he or she is operating the vehicle (similar to FIG. 2E). In another embodiment, if there are more than one pertinent mobile device, then the motor vehicle operator device selected by a first pertinent mobile device must match the motor vehicle operator device by a second pertinent mobile device for the motor vehicle operator device to be identified. In another embodiment, if there are more than one pertinent mobile device, and if any pertinent mobile device user selects a motor vehicle operator device different than or that does not match any of the motor vehicle operator devices selected by any other pertinent mobile device user, then the system will deem that the motor vehicle operator device has not been selected. Additionally, a motor vehicle operator device may not be identified if a motor vehicle operator device is not identified within a predetermined time. For example, the predetermined time and maybe set for 15 seconds after the pertinent mobile devices determined and if a motor vehicle operator device is not identified within 15 seconds, then the system deems that the motor vehicle operator device has not been identified. However, it is understood that other amount of time may also be used for the predetermined amount of time and are within the scope of the present invention. Additionally, the system may deem that a motor vehicle operator device has not been identified if the more than one motor vehicle operator device has been selected by the pertinent motor devices within or associated with a single motor vehicle. In other words, if the pertinent mobile devices select different motor vehicle operator devices, then the system will deem that a. motor vehicle operator device has not been identified. If a motor vehicle operator device is not identified, then the process flow moves to step 330.

Requiring that the pertinent mobile devices input data to identify a single motor vehicle operator device is a unique feature. This is unique because unlike many of the prior art, it serves as a self-policing mechanism as will be explained below. In step 330, if a motor vehicle operator device is not identified within a predetermined amount of time as explained above, then the computer application causes all mobile devices determined to be within the motor vehicle to move into or to be remain in the locked configuration. This is a policing mechanism because if pertinent mobile device users do not identify the driver or operator of the motor vehicle, then no one in or associated with the motor vehicle may operate their mobile devices. With teenagers and other younger drivers, passengers not driving will want to use their mobile phones. As a result, this feature of denying access to all pertinent mobile devices if a motor vehicle operator device is not identified facilitates encouraging all the mobile device users within the vehicle to select a single mobile device to be identified as the motor vehicle operator device.

On the other hand, if a motor vehicle operator device is identified, then the process flow moves to step 333. In step 333, only the identified motor vehicle operator device will move to or in remain a locked configuration and the remaining motor vehicle non-operator devices will move to or are maintained in the unlocked configuration. As mentioned above, in the locked configuration and operator may have limited access or no access to a remote computing device or mobile device. For example, in one embodiment, in the locked configuration a user only has access to GPS and other geographical map data for navigation purposes. In other embodiments, in the locked configuration a user has access to no functions of the cellular telephone or mobile device. Additionally, in other embodiments, various functions may be allowed or disallowed in the locked configuration.

Unlike the prior art, the act of selecting a motor vehicle operator driver makes it extremely difficult to operate a motor vehicle and operate a mobile device given that the mobile device will not function unless an operator driver of a motor vehicle selected. The system may vary the number of features that are available in both the unlocked and locked configuration.

Next, in step 340, the system or computer application is configured to continually determine if the vehicle is not moving for a predetermined length of time, and if the particular mobile device is a person's mobile device. In one embodiment, the vehicle is defined as moving if all mobile devices determined to be within the motor vehicle have a velocity of at least 10 mph for at least 5-15 seconds. Additionally, the system may also be configured so that the definition or threshold for a moving vehicle may be adjustable. However, other embodiments or parameters may be used to determine the threshold for determining if a vehicle is moving may also be used and is in within the spirit and scope of the present invention. If the vehicle is determined to be moving, then the process moves to step 325. As mentioned above, in step 325, the computer application is configured to determine if the same by all devices by comparing the driver data input into the user interfaces. If the motor vehicle operator device has not been identified, then the workflow moves back to step 330. If the motor vehicle operator device has been identified, the system will move to step 333. In step 333, as mentioned above, the motor vehicle operator device moves to or is maintained in the locked configuration and the motor-vehicle non-operating devices moves to or is maintained in the unlocked configuration. The system is configured to continually operate in such a loop until it is determined that the mobile devices are no longer within a vehicle.

On the other hand, if it is determined that all the pertinent mobile devices within the vehicle are not moving, then the system moves a process flow to step 345. In step 345, the system moves to or maintains all the devices into the unlocked configuration until his determined that the vehicle is moving again (see FIG. 3 where the system loops to step 305). It is understood that the definition of moving and not moving can be adjusted depending on the application. Additionally, the system is also configured to continually loop and move back to step 305 to receive location data and accelerometer type data from the position locating element to determine if the device is still a pertinent mobile device.

FIG. 3A is a flowchart showing the control flow of the process 350 for allowing a limited unlocked configuration if override data or correct code for activating the override feature is received, according to an example embodiment. FIG. 3B is a graphic interface 390 on a mobile device 396 for receiving override data for allowing the mobile device to move between the locked configuration into the unlocked configuration, according to an example embodiment. In step 360 of FIG. 3A, the system is configured to provide a user interface to each mobile device. FIG. 3B is an non-limiting embodiment of the graphical interface 390 for displaying an area 396 for receiving a code input by the user for activating the overriding feature. Each user interface is configured for receiving a code for activating the override feature and for allowing a mobile device to move from the locked configuration to a limited unlocked configuration or fully unlocked configuration. In one embodiment, in the limited unlocked configuration, the user may have the ability to just simply make phone calls to an emergency contact number, or a parent or guardian. For example, if an emergency happens, or if a parent or guardian is in the vehicle, a parent way enter override input into the user interface to move the system from pertinent mobile device from the locked configuration to the unlocked or limited access unlocked configuration. In other embodiments, the code may be provided to give the mobile device use full access to the functions of the mobile device. The amount of functionality that a mobile device may have in the limited unlocked configuration may be varied.

Next, in step 370, after a code has been entered into the user interface, if the code is correct, then the process flow moves to step 375 and the computer application allows the mobile device to move into the limited unlocked configuration. In other embodiments, if the override code is correct, then the system will move or provide full access to the unlocked configuration.

On the other hand, if the override is not correct, then the process flow moves to step 380 and the system remains in the locked configuration. In one embodiments, the code for activating the overriding feature for allowing the mobile device to move from the locked configuration to the unlocked configuration or limited unlocked configuration must be input into the user interface prior to the motor vehicle beginning moving as defined by the parameters within the application. In one embodiment, the code may include comprises an alpha-numeric characters the code that is originally provided to the mobile device user by telephone. In one embodiment, the user can enter in or select his or her own code for overriding the system. In other embodiments, device user must call into a central database to receive the code for the first time. The step of calling into a centralized database to receive a code allows the mobile device owner, such as a parent or other legal guardian of a teenager or younger person, to receive the code while preventing the teenager or other younger driver for receiving the code. However, it is understood that other types of overriding controls and features may also be used and are within the spirit and scope of the present invention.

FIG. 3C is a flowchart showing the control flow of the process for moving the system to a locked configuration if a position locating element is not enabled, according to an example embodiment. Additionally, in other embodiments the computer application is configured to move the mobile device into the locked configuration if the wireless communication feature of the device is not enabled. This feature prevents a user from disabling their wires communication in order to use distracting features of the mobile phone while driving. In step 391, the system is configured to determine if the position locating element is not enabled. If the system does not receive a signal from the position locating element or the system by other means determines if the position locating element is not enabled, then the process moves to step 393. In step 393, after the system determines, based upon the data received from the mobile device, that the position locating element is not enabled preventing the system from determining if the mobile device is a pertinent mobile device, the system will automatically move into or maintain the mobile device in the locked configuration. On the other hand, if the system determines, based upon the data received from the mobile device, that position locating element is in enabled, then the system will return to step 305 of process flow 300.

Figure 4:
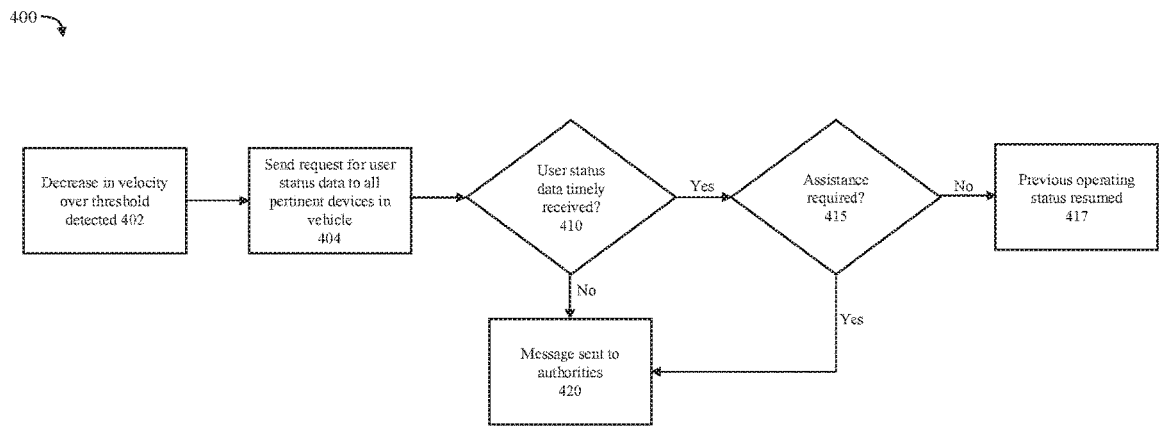
FIG. 4 is a flowchart showing the control flow of the process for notifying authorities if an emergency is detected for applications, methods and systems for preventing a mobile device user from operating a mobile device while driving a motor vehicle, according to an example embodiment.

FIG. 4 is a flowchart showing the control flow of the process 400 for notifying authorities if a traffic event or an emergency is detected, according to an example embodiment. The system is configured for detecting a decrease in velocity over a predetermined threshold given that locating element is configured for providing acceleration type data, including data that indicates a rapid decrease in velocity or rapid deceleration event. A rapid decrease in velocity over the predetermined threshold is indicative of an emergency traffic event or emergency. In step 402, the system can detect a decrease in velocity over said predetermined threshold. For example, if a rapid decrease in velocity from 60 miles per hour to 0 miles per hour is detected, then a decrease in velocity would be over the predetermined threshold and process flow 400 would be enacted. However, other parameters for the threshold may also be used and are within the spirit and scope of the present invention. If a decrease in velocity over the predetermined threshold has been detected, then the process flow moves to step 404.

In step 404, after the decrease in velocity over the predetermined threshold has been detected, then the system will send a request for user status data to all the devices in the vehicle. The computer application is configured to provide a. user interface to all said mobile devices for receiving user status data if the computer application determines a decrease in velocity greater than a predetermined change in velocity threshold. One embodiment of such an interface is the interface illustrated in FIG. 4A. The user status data may include input as to whether emergency assistance was required after a traffic event. The user status data may include a positive or negative response received via the graphical user interface, such as a swipe or swiping gesture, push of a button or other means of indicating a user preference. Such user interfaces may be configured for displaying information and receiving input from users. For example, the user interface may require that the user input user status data related to the answer to the question "Are you okay?", "Do you need help?", or "Do you need medical attention?", "Do you need emergency assistance?".

Figure 4A:
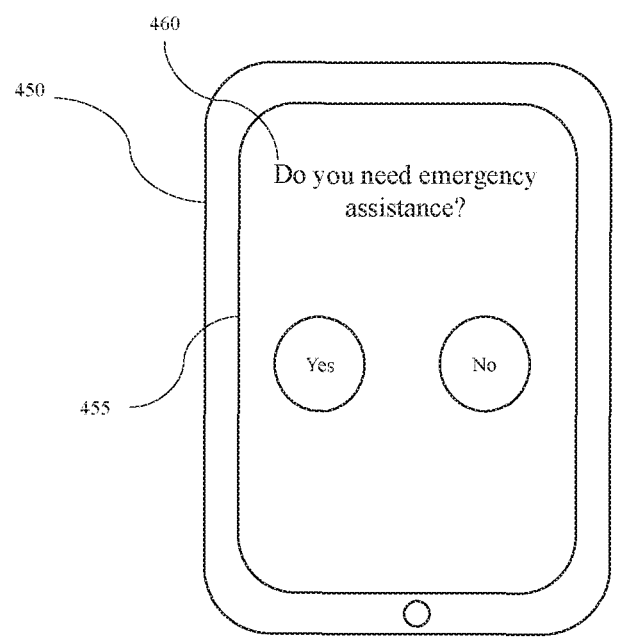
FIG. 4A is a graphic interface for requesting user status data for applications, methods and systems for preventing a mobile device user from operating a mobile device while driving a motor vehicle, according to an example embodiment.

FIG. 4A is a graphical interface for 455 displayed on a mobile device 450 for requesting user status data, according to an example embodiment. The graphical interface for requesting user status data requests that a user answer questions, such as "Are you okay?", "Do you need help?", or "Do you need medical attention?", "Do you need emergency assistance". In the present embodiment, the graphical interface displays question 460 "Do you need emergency assistance?". In one embodiment, the user may provide a response and user status data by performing the gesture required, such as a swipe, push of a button, touch of the screen or other means to indicate an appropriate response.

Next, the process flow moves to step 410. In step 410, the system determines if the user status data has been received from at least one device within a predetermined time after an event has been detected. If no mobile device user status data is received within a predetermined time by at least one of said pertinent mobile devices, then the system moves to step 420 and the system transmits an emergency message to contact the appropriate authorities or contact the user's emergency contact information. In one embodiment, such message may be an SMS text message, email message, telephone call or any other appropriate means of providing a message to authorities.

On the other hand, in step 415, if mobile device user status data is received within the predetermined time, then the computer application is configured to determine if assistance is required based upon the user status input received. It is understood that it may also be required that user status data must be received from more than one device in order to move to step 415 or prevent the system from automatically sending a message to authorities or a user's emergency contact information. If user status data is received by the appropriate number of devices within a predetermined time, and no assistance is required based upon the user status input received, then the process moves to step 417 and normal operating status resumes allowing the mobile devices to return to their corresponding locked and unlocked configurations. However, on the other hand, if the user status data is not received within the predetermined amount of time by the appropriate number of devices, the process moves to step 420, and a message may be sent to authorities notifying such authorities of a crash event. Additionally, a message may be also sent to a person's emergency contact through the emergency contact information stored in the user device record.

Figure 5:
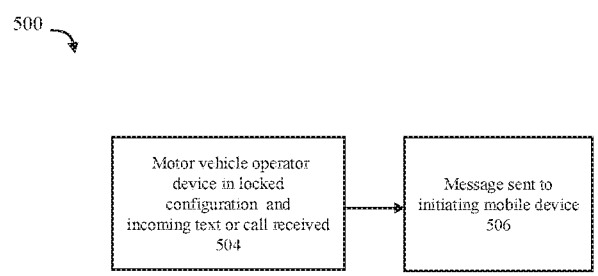
FIG. 5 is a flowchart showing the control flow of the process for notifying another party attempting to a mobile device for applications, methods and systems for preventing a mobile device user from operating a mobile device while driving a motor vehicle, according to an example embodiment; and, FIG. 6 is a block diagram of a system including an example computing device and other computing devices, according to an example embodiment.

FIG. 5 is a flowchart showing the control flow of the process 500 for notifying another party attempting to contact a motor vehicle operator device, according to an example embodiment. The computer application is further configured to route an incoming call to an answering service and provide to a remote device initiating the incoming call an informative message and other informative data if the mobile device is in the locked configuration. Additionally, the computer application is further configured to receive an incoming text message and provide to a. remote device initiating the incoming text message an informative message and other informative data related to the mobile device if the mobile device is in the locked configuration.

In step 504 if the mobile device is in the locked configuration and an incoming call or text is received, then the system is configured to move to step 506. In step 506, the system is configured route a call to answering service and/or to send a personalized message to the remote computing device initiating text message. In one embodiment, the methods may be an SMS message, email message, or the types of messages that are known to those skilled in the art. This component of the process allows a person to notify people that they are driving and cannot answer the phone. Such messages may be personalized.

Figure 6:
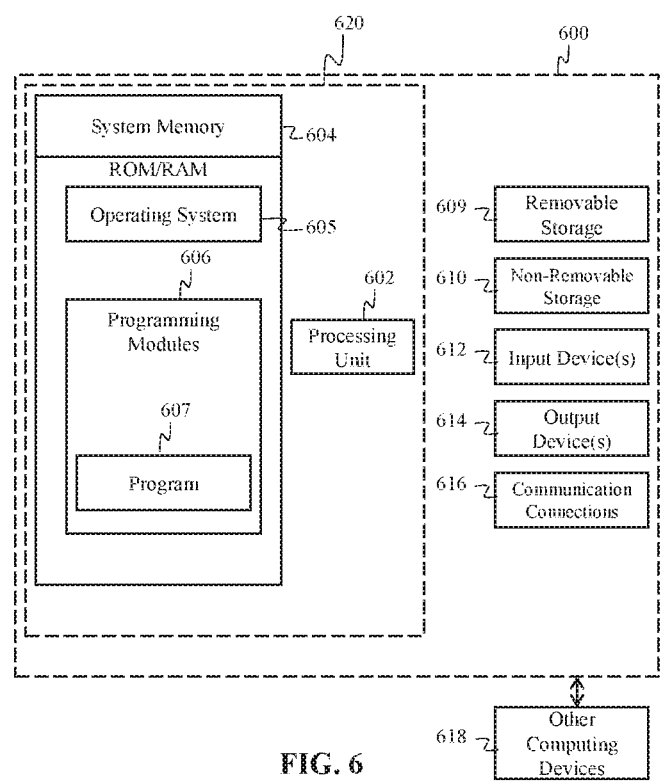

FIG. 6 is a block diagram of a system including an example computing device 600 and other computing devices. Consistent with the embodiments described herein, the aforementioned actions performed by devices 112, 122, 132, 142 and server 102 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for systems 100 and processes 200, 300, 400, and 500 as described above. Processes 200, 300, 400 and 500 may operate in other environments and are not limited to computing device 600.

With reference to FIG. 6, a system consistent embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of server 102 and mobile devices 112, 122, 132, 142 for example. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media, Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the process 500 as described above. The aforementioned processes are examples, and processing unit 602 may perform other processes and may also be configured to provide user interfaces displayed in FIGS. 2A, 2B, 3B, and 4A. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A non-transitory computer readable medium storing computer readable program code which when executed on a server is for preventing a mobile device user from operating a mobile device while operating a motor vehicle, wherein the computer application is configured for:

receiving a plurality of mobile device user data of a mobile device user and storing the mobile device user data in a mobile device user record in an attached database;

determining, by using the mobile device and the server to which the mobile device is in communication with, wherein the server is not attached or proximate to the motor vehicle, pertinent mobile devices within the motor vehicle by determining a) if the mobile device is moving in a similar fashion as a moving motor vehicle by using location data from a position locating element in each mobile device; and b) if the mobile device is within a predetermined proximity of at least a second mobile device by using the position locating element in each mobile device;

providing a graphical user interface to each of the pertinent mobile devices for selecting a motor vehicle operator device, wherein the graphical user interface for selecting the motor vehicle operator device comprises at least a graphical representation of an icon having an identifying mark representing each of all pertinent mobile devices within the motor vehicle;

causing all pertinent mobile devices to move into or remain in a locked configuration if a motor vehicle operator device is not identified, wherein identifying the motor vehicle operator device requires all mobile device users associated with all pertinent mobile devices within the motor vehicle to select a matching icon having a same identifying mark associated with the motor vehicle operator device;

causing a plurality of motor vehicle non-operator devices to move into or remain in the unlocked configuration if a motor vehicle operator device is identified;

causing the motor vehicle operator device to move into or remain in the locked configuration if the motor vehicle is moving;

causing the motor vehicle operator device to move into or remain an unlocked configuration if a) the motor vehicle is not moving for a predetermined amount of time, or 2) if the motor vehicle operator device is no longer one of the pertinent mobile devices.

2. The non-transitory computer readable medium storing computer readable program code of claim 1, wherein the position locating element comprises a GPS element.

3. The non-transitory computer readable medium storing computer readable program code of claim 1, wherein the position locating element provides location data for each mobile device.

4. The non-transitory computer readable medium storing computer readable program code of claim 1, wherein in the unlocked configuration the mobile device has access to a plurality of map data.

5. The non-transitory computer readable medium storing computer readable program code of claim 1, wherein in the unlocked configuration the mobile device has access to normal operating features.

6. The non-transitory computer readable medium storing computer readable program code of claim 1, wherein the motor vehicle is defined as moving if all pertinent devices have a velocity of at least 10 miles per hour for at least 5 seconds.

7. The non-transitory computer readable medium storing computer readable program code of claim 1, wherein the mobile device user data comprises at least a user name, user age, and a user email address.

8. The non-transitory computer readable medium storing computer readable program code of claim 1, wherein the graphical user interface is further configured for receiving override data for allowing the mobile device to move between the locked configuration into the unlocked configuration.

9. The non-transitory computer readable medium storing computer readable program code of claim 8, wherein the override data comprises at least four-digit alpha-numeric characters.

10. The non-transitory computer readable medium storing computer readable program code of claim 9, wherein override data is input into the graphical user interface prior to the motor vehicle moving.

11. The non-transitory computer readable medium storing computer readable program code of claim 1, wherein the computer application is further configured to move the mobile device into the locked configuration if position location element of the mobile device is not enabled.

12. The non-transitory computer readable medium storing computer readable program code of claim 1, wherein the computer application is further configured, if the mobile device is in the locked configuration, to route an incoming telephone call from a call initiating device to a voicemail system to provide an informative message and other informative data.

13. The non-transitory computer readable medium storing computer readable program code of claim 1, wherein the computer application is further configured to receive an incoming text message and provide to a remote device initiating the incoming text message an informative message and other informative data related to the mobile device if the mobile device is in the locked configuration.

14. The non-transitory computer readable medium storing computer readable program code of claim 1, wherein the computer application is configured to provide the graphical user interface to the pertinent mobile devices for receiving mobile device user status data if a decrease in velocity greater than a predetermined change in velocity threshold is detected by the position locating element,
  if no mobile device user status data is received from at least one of the pertinent mobile devices within a second predetermined time, wherein the user status data is physically input on the graphical user interface from the pertinent mobile devices within the motor vehicle, then the system is configured to send an emergency message to authorities, and,
  if mobile device user status data is received from at least one of the pertinent mobile devices within a second predetermined time, then the computer application is configured to allow the mobile devices to return to their corresponding locked and unlocked configurations.

15. A method for preventing a mobile device user from operating a mobile device while operating a motor vehicle comprising:

determining, by using the mobile device and the server to which the mobile device is in communication, wherein the server is not attached or proximate to the motor vehicle, pertinent mobile devices within the motor vehicle using location data provided from a position locating element in each mobile device;

providing a graphical user interface to each of the pertinent mobile devices for selecting a motor vehicle operator device, wherein the graphical user interface for selecting the motor vehicle operator device comprises at least a graphical representation of an icon having an identifying mark representing each of all pertinent mobile devices within the motor vehicle;

causing all pertinent mobile devices within the motor vehicle to move into a locked configuration if a motor vehicle operator device is not identified, wherein identifying the motor vehicle operator device requires all mobile device users associated with all pertinent mobile devices within the motor vehicle to select matching icons having a same identifying mark associated with the motor vehicle operator device;

causing a plurality of motor vehicle non-operator devices to move into the unlocked configuration if a motor vehicle operator device has been identified;

causing the motor vehicle operator device to move into an unlocked configuration if a) the motor vehicle is not moving for a predetermined amount of time, or 2) if the motor vehicle operator device is no longer one of the pertinent mobile devices.

16. The method of claim 15, wherein the motor vehicle is defined as moving if all pertinent devices have a velocity of at least 10 miles per hour for at least 5 seconds.

17. The method of claim 15, wherein the method is further configured to provide the graphical user interface to the pertinent mobile devices for receiving mobile device user status data if a decrease in velocity greater than a predetermined change in velocity threshold is detected by the position locating element,
   if no mobile device user status data is received from at least one of the pertinent mobile devices within a second predetermined time, then the system is configured to send an emergency message to authorities, and,
   if mobile device user status data is received from at least one of the pertinent mobile devices within a second predetermined time, then the computer application is configured to allow the mobile devices to return to their corresponding locked and unlocked configurations.

18. A system, over a communications network, for preventing a mobile device user from operating a mobile device while operating a motor vehicle, comprising:
   a database for storing a mobile device user record for each of a plurality of mobile device users, wherein each mobile device user record includes at least a unique mobile device identifier and an email address;
   a memory;
   a network interface device communicatively coupled with the communications network; and,
   a processor configured for:
      receiving, over the communications network, a plurality of mobile device user data of a mobile device user and storing the mobile device user data in a mobile device user record in an attached database;
      determining, by using the mobile device and the server to which the mobile device is in communication, wherein the server is not attached or proximate to the motor vehicle, pertinent mobile devices within the motor vehicle by determining a) if the mobile device is moving in a similar fashion as a moving motor vehicle by using location data from a position locating element in each mobile device; and b) if the mobile device is within a predetermined proximity of at least a second mobile device by using the position locating element in each mobile device;
      providing, over the communications network, a graphical user interface to each of the pertinent mobile devices for selecting a motor vehicle operator device, wherein the graphical user interface for selecting the motor vehicle operator device comprises at least a graphical representation of an icon having an identifying mark representing each of all pertinent mobile devices within the motor vehicle;
      causing all pertinent mobile devices to move into or remain in a locked configuration if a motor vehicle operator device is not identified, wherein identifying the motor vehicle operator device requires all mobile device users associated with all pertinent mobile devices within the motor vehicle to select a matching icon having a same identifying mark associated with the motor vehicle operator device;
      causing a plurality of motor vehicle non-operator devices to move into or remain in the unlocked configuration if a motor vehicle operator device is identified;
      causing the motor vehicle operator device to move into or remain in the locked configuration if the motor vehicle is moving;
      causing the motor vehicle operator device to move into or remain an unlocked configuration if a) the motor vehicle is not moving for a predetermined amount of time, or 2) if the motor vehicle operator device is no longer one of the pertinent mobile devices.

19. The system of claim 18, wherein the motor vehicle is defined as moving if all pertinent devices have a velocity of at least 10 miles per hour for at least 5 seconds.

20. The system of claim 19, wherein system is configured to provide, over the communications network, the graphical user interface to the pertinent mobile devices for receiving mobile device user status data if a decrease in velocity greater than a predetermined change in velocity threshold is detected by the position locating element, wherein the user status data includes physically input on the graphical user interface from the pertinent mobile devices within the motor vehicle,
   if no mobile device user status data is received from at least one of the pertinent mobile devices within a second predetermined time, then the system is configured to send an emergency message to authorities, and,
   if mobile device user status data is received from at least one of the pertinent mobile devices within a second predetermined time, then the computer application is configured to allow the mobile devices to return to their corresponding locked and unlocked configurations.

* * * * *